United States Patent [19]
Le Masurier

[11] 3,858,676
[45] Jan. 7, 1975

[54] SOUND ABSORBING PANEL

[76] Inventor: Philip H. Le Masurier, Candlehill Rd., New Fairfield, Conn. 06810

[22] Filed: Oct. 5, 1973

[21] Appl. No.: 403,968

Related U.S. Application Data

[63] Continuation-in-part of Ser. No. 326,221, Jan. 22, 1973, abandoned.

[52] U.S. Cl............................ 181/33 G, 181/33 GB
[51] Int. Cl................................................. E04b 1/84
[58] Field of Search ...................... 181/33 G, 33 GB

[56] References Cited
UNITED STATES PATENTS

| | | | |
|---|---|---|---|
| 2,355,608 | 8/1944 | Stieger | 181/33 G UX |
| 2,968,327 | 1/1961 | Mariner | 181/33 G UX |
| 3,182,747 | 5/1965 | Wilhelmi et al. | 181/33 G UX |
| 3,253,947 | 5/1966 | McClurer et al. | 181/33 G UX |
| 3,448,823 | 6/1969 | Smith | 181/33 G UX |
| 3,630,310 | 12/1971 | Federer | 181/33 G |
| 3,748,799 | 7/1973 | Tough et al. | 181/33 GB |

FOREIGN PATENTS OR APPLICATIONS

| | | | |
|---|---|---|---|
| 207,716 | 5/1957 | Australia | 181/33 G |
| 609,889 | 10/1948 | Great Britain | 181/33 G |
| 858,049 | 1/1961 | Great Britain | 181/33 G |
| 863,611 | 3/1961 | Great Britain | 181/33 G |
| 1,263,131 | 4/1961 | France | 181/33 G |

OTHER PUBLICATIONS

Beranek, L. L., Noise Reduction, N.Y., McGraw-Hill, 1960. pp. 248–256, (copy in A.U. 214).

Primary Examiner—Richard B. Wilkinson
Assistant Examiner—John F. Gonzales
Attorney, Agent, or Firm—Gardiner, Sixbey, Bradford and Carlson

[57] ABSTRACT

A thin sound-absorbing panel especially suitable for interior wall surfaces exhibits enhanced broad band sound absorption and especially for low frequency sounds. By low frequency is meant those below 500 Hertz (cycles per second), preferably as measured at 125 and 250 Hertz. The preferred construction involves a three layer panel having a perforated backing, a heavy textile front having a surface mass of 12–24 ounces per 1 square yard and an SFR of 300 to 1,800 MKS rayls and a fiberglass core.

9 Claims, 4 Drawing Figures

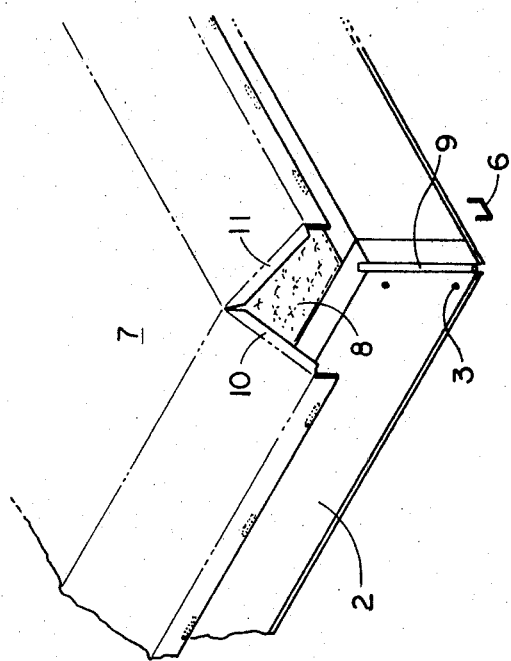
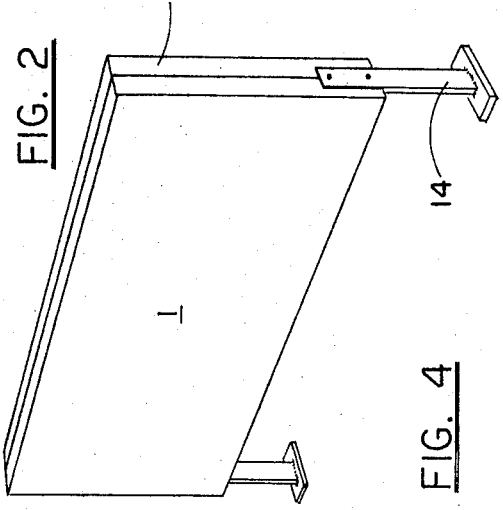
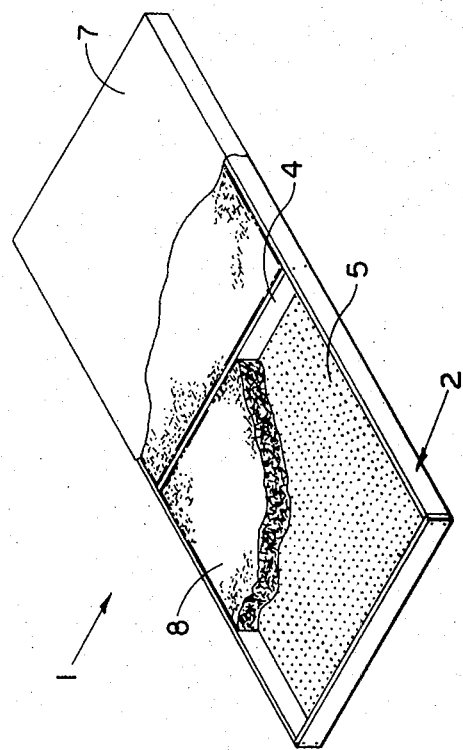
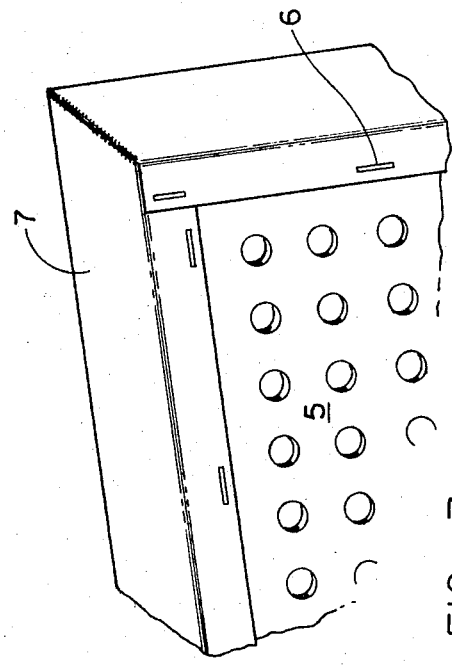

SOUND ABSORBING PANEL

This invention relates to improvements in a thin sound-absorbing panel and the present application is a continuation-in-part of U.S. application Ser. No. 326,221, filed Jan. 22, 1973, now abandoned.

BACKGROUND AND SUMMARY OF INVENTION

One aspect of the invention relates to improvements in a thin sound-absorbing panel that is especially effective in absorbing low frequency sounds and additionally, has enhanced broad band sound absorption characteristics.

It is known in the art, that the low frequency sounds (below about 500 Hertz) are usually more difficult to absorb, given the same sound absorbing body, than are most high frequency sounds. Various types of noises in the environment contain low frequency components or are themselves low frequency. The noise from heating and air conditioning systems, computers, background office sounds, classroom sounds, machinery and the like all contain low frequency components which are extremely difficult to subdue, particularly where limitations must be placed on the thickness of the sound absorbent materials since low frequency components may often require much thicker sound insulation than the high frequency components require for effective sound absorption.

The present invention has for one object the provision of a thin, tackable sound-absorbing panel.

The present invention makes use of the discovery that a certain combination of materials produces low frequency sound absorbing effects, (e.g. as measured at 125 and 250 Hertz) which are often as high as twice as effective as slightly different systems as determined by the sound absorption coefficient at the stated low frequencies. In addition, these particular panels are thin, preferably in the range from about one to about two inches thick and are possessed of characteristics which effectively absorb high frequency sound.

A thin sound-absorbing panel according to the present invention is a three-layer article having a backing or rear panel of perforated material such as hardboard or metal, a forward face or surface of a heavy textile material having certain weight or specific mass and surface flow resistance, and a layer between those two of fiberglass. The backing is mounted on a frame with the perforated surface and textile on opposite faces and the fiberglass held within the frame. Preferably, the frame is wood although other rigid framing materials will serve as a support, as well, if the economic factors are the same.

Sound absorption coefficients on the order of about 0.95 or higher at 250 Hertz have been obtained in tests, however, the predicted coefficients might be on the order of half or two-thirds thereof or in the range of 0.55 to 0.68.

Other objects, advantages and features will become apparent from a reading of the following disclosure wherein:

FIG. 1 is a partially cutaway view of a panel according to the invention shown vertically in the position it would assume when installed on a wall;

FIG. 2 is an isometric exploded view showing a corner detail prior to assembly;

FIG. 3 shows isometrically one embodiment of the back of the FIG. 2 sound screen; and FIG. 4 illustrates a free-standing sound screen comprising two of the panels back to back.

FIG. 1 shows a preferred embodiment of the invention wherein a thin wall panel 1 that is less than about 2 inches thick and has exceedingly good low frequency sound absorption is provided. A frame 2, preferably of wood strips, is provided. The wood strips are fastened together by nails 3 or some other suitable fastener. A combination of fasteners and adhesives may be employed if desired. A crosspiece 4 may be provided if the panel is long enough to require same.

Attached to one side or the rear face of the panel frame is a perforated backing 5. It is important that the backing be perforated. The backing can be selected from the group consisting of perforated composition board also known as hardboard or of perforated metal, preferably perforated metal lath. The backing 5 is secured to the frame 2 by any suitable means such as nails, screws, staples, or the like.

On the forward side of the panel is a heavy textile material 7. As in FIG. 3 it is secured by staples 6 driven preferably into the edge portion of textile that is folded back under the frame 2. This material preferably is selected from the group consisting of cotton, jute, a mixture of cotton and jute and a non-woven monocrylic. Other fibers may be used also. In any case, the material 7 should have a surface mass of at least 12 ounces to 24 ounces per square yard, preferably around 20 ounces per square yard, and should be capable of retaining a thumbtack, not only alone but also when loaded with a layer of illustration board or posterboard because it may be desired in connection with interior walls to mount posters thereon.

In addition to the specified surface mass range, the facing material must have a SFR of from 300 to 1,800 MKS rayls. SFR is an abbreviation for specific flow resistance, i.e., the resistance of the fabric to air flowing through it, this measurement, being expressed in rayls. Thus a fabric having a very high resistance to air flow, i.e., relatively impermeable to air, has an SFR of 2,000 rayls or more while a fabric having a very low resistance to air flow, i.e., a very open, permeable fabric may have an SFR of well under 250 rayls.

Examples of a fabric which possesses the properties required for purposes of this invention are jute-cotton canvas having a surface mass of 16 ounces/square yard an SFR of 400 rayls. Such material is available from a number of manufacturers and the mentioned factors may be designated. Another example of a satisfactory material is the very dense monoacrylic fabric manufactured by J. P. Stevens Co., having a surface mass of 21 ounces/square yard and having an SFR of 1,200 MKS rayls. In this regard, it is interesting to note that the effectiveness of this material is vastly improved where the perforated backboard is more open, i.e., has perforations larger than ⅛ inch, or a greater number of ⅛ inch perforations as for example when the backboard is a metal lath known as "truss loop metal lath."

The space between the textile 7 and the backboard is substantially filled by a layer of fiberglass sound insulation 8 which has a thickness in the range of about one inch to about two inches. It should have a specific gravity of about 0.05 and a sound absorption coefficient in inch and a half thicknesses at 125 Hertz of about 0.15 and at 250 Hertz of about 0.40, as determined by ASTM C 423-66.

In FIG. 2 there is shown a corner detail wherein a slot 9 is cut in the wood strip 2 to receive the tabs 10 and 11 which are cut in the fabric 7. This provides a smoother finish at the corner and helps to maintain both the vertical and horizontal tension and smoothness in the textile facing 7.

The following data inlcudes examples of fiberglass sound absorption coefficients at selected test frequencies for a given thickness at 0.05 specific gravity. The low frequency coefficients in particular are compared with the low frequency coefficients obtained from panels constructed according to the present invention with various materials and it is quite evident that fiberglass alone is a relatively inefficient material for absorption of sound in the 250 Hz range, the absorption being a direct function of thickness, note Examples 3 and 8. Obviously, the thickness required to produce the desired coefficient of absorption in the 250 $H_2$ range would be beyond useable feasibility particularly where space requirements restrict the thickness of the material or panels that can be used.

The following examples show sound absorption coefficients obtained by ASTM C 423-66 using various combinations of materials but with no regard to SFR or to the relationship between SFR and the preferred backing material.

SOUND ABSORPTION COEFFICIENTS ($\alpha$) MEASURED IN ⅓ OCTAVE BANDS

| Sample | 125 Hz | 250 Hz | 500 Hz | 1 KHz | 2 KHz | 4 KHz |
|---|---|---|---|---|---|---|
| 1 | .38 | .95 | 1.14 | .95 | 1.02 | .90 |
| 2 | .02 | .18 | .44 | .79 | .92 | .87 |
| 3 | .15 | .40 | .72 | .88 | .80 | .78 |
| 4 | .07 | .25 | .60 | .87 | .94 | .83 |
| 5 | .26 | .97 | 1.08 | 1.00 | .83 | .90 |
| 6 | .04 | .28 | .76 | .89 | .56 | .40 |
| 7 | .22 | .55 | 1.00 | .97 | .95 | .92 |
| 8 | .08 | .27 | .65 | .82 | .75 | .73 |

(All tests done by ASTM C 423-66)

Sample 1 —
Complete panel 1 ¾ inches thick with fiberglass as in Sample 3, a fabric front of S/183 White Lamp Finley jute/cotton, weighing 20 ounces per square yard and a backing of ⅛ inch perforated hardboard.

Sample 2 —
Like Sample 1 but without any fiberglass.

Sample 3 —
Owens Corning fiberglass only, 1 ½ inches thick, No. 703 specific gravity 0.05 (manufacturer's data).

Sample 4 —
Like Sample 5 but without any fiberglass.

Sample 5 —
Complete panel 1 ¾ inches thick with fiberglass as in Sample 3, a fabric front of J. P. Stevens non-woven monoacrylic filaments back coated with latex (total weight of 20 oz./sq.yrd. and a backing of Bostwick's Truss Loop Metal Lath.

Sample 6 —
Complete panel 1 ¼ inches thick with fiberglass as in Sample 3 which is only 1 inch thick however and a fabric front as in Sample 5 and having a ⅛ inch thick solid hardboard backing.

Sample 7 —
Constructed like Sample 6 except that it has a one-eighth inch thick perforated hardboard backing with perforations about 3/16 inches diameter spaced about 1 inch apart.

Sample 8 —
Owens Corning fiberglass, only 1 inch thick, No. 703 (manufacturer's data).

Samples 1 and 5 above have exceedingly high sound absorption coefficients at the 125 and 250 Hertz or low frequency measurements. These are four or more times greater than the coefficients for the systems containing the same panel (compare Samples 2, 4) but without any fiberglass insulation. They are also more than double what the fiberglass alone is. They are also approximately 50 percent greater than the sum of fiberglass plus the empty frame.

Samples 6 and 7 show dramatically the difference achieved by using perforated hardboard. When no perforations are in the backing, a much lower absorption coefficient is realized.

A thin but effective panel is an important result of the present invention. It is, therefore, important that a thickness of less than about 2 inches be maintained. The preferred embodiment of this invention is a panel 1 having an overall thickness from front to back of from about 1 inch to 2 inches and preferably in the range from an inch and a quarter to 1 ¾ inches.

A panel constructed according to the invention preferably is secured to a wall. The best mounting is on furring strips. Securement can be by nails, screws, etc.

FIG. 4 illustrates a free-standing sound screen comprising two of the aforesaid panels secured together back-to-back and mounted on legs 14. It is useful as a movable sound screen or movable partition in the central part of rooms.

While the above examples dramatize the greater effectiveness of panels utilizing various facings and backing materials in combination, as compared with fiberglass, alone, as a sound absorbent material, the beneficial results which flow from the recognition that not only surface mass but SFR, surface flow resistance, is a critical factor in efficiently absorbing sound in the low frequency range, particularly at 250 Hz and below.

The following data illustrates the effect of SFR, specific flow resistance as measured in MKS rayls, on the sound absorption efficiency of panels in the lower frequency ranges of about 250 Hz.

⅓ OCTAVE BAND ABSORPTION COEFFICIENTS

| | PANEL DESIGNATION/FABRIC All panels are 1¾" thick & use ⅛" perf. hrdbd back except where noted | SURFACE MASS (oz/sq.yd.) | SPECIFIC FLOW RESISTANCE MKS rayls | 125 Hz | 250 Hz | 500 Hz | 1000 Hz | 2000 Hz | 4000 Hz |
|---|---|---|---|---|---|---|---|---|---|
| 9) | PL-303-1 No fabric on face, ⅛" perf. hardboard back | — | 0 | .25 | .55 | .76 | .88 | .82 | .75 |
| 10) | PL-303-1 with Burbeauty Burlap | 10.5 oz/sq. yd. | 24 | .30 | .60 | .93 | .86 | .80 | .87 |

⅓ OCTAVE BAND ABSORPTION COEFFICIENTS — Continued

| PANEL DESIGNATION/FABRIC All panels are 1¾" thick & use ⅛" perf. hrdbd back except where noted | SURFACE MASS (oz/sq.yd.) | SPECIFIC FLOW RESISTANCE MKS rayls | 125 Hz | 250 Hz | 500 Hz | 1000 Hz | 2000 Hz | 4000 Hz |
|---|---|---|---|---|---|---|---|---|
| 11) PL-303-1 with Gillespie PVC Backed Burlap | 10 oz/sq.yd. | 176 | .29 | .68 | .86 | 1.10 | .90 | .82 |
| 12) PL-303-1 with Engineered Yarn Facing Fabric | 19 oz/sq.yd. | 13 | .11 | .58 | .92 | .95 | .85 | .87 |
| 13) PL-303-1 Cotton/Jute Canvas | 16 oz/sq.yd. | 405 | .38 | .95 | 1.14 | .95 | 1.02 | .90 |
| 14) PL-303-2LB TLVS J.P. Stevens ("Truss Loop" Back) | 21 oz/sq.yd. | 1200 | .26 | .97 | 1.08 | 1.00 | .83 | .90 |
| 15) PL-303-2LB J.P. Stevens | 21 oz/sq.yd. | 1200 | .17 | .59 | .93 | .92 | .52 | .90 |

Again, all tests were performed in accordance with ASTM C 423-66 procedure.

It is noted that throughout the above the panels were comprised of fiberglass of designed character of not more or less than 1 ½ inch thickness backed by a perforated hardboard having ⅛ inch perforations with the exception of panel 6 which utilized a metal lath Truss Loop backing board. Thus the Examples 9–15 closely relate to Example 3 but show improvement thereover, note Example 9 and 3, because of the presence of the perforated backing member.

The criticality of the SFR of the facing is dramatically illustrated in a comparison of Examples 9, 11 and 13. In Example 9 no facing material is provided but the panel consisted of fiberglass alone with a fiberboard backing perforated with ⅛ inch perforations. At 250 Hz the coefficient is 0.55. This may also be contrasted with Example 3, using fiberglass only, where the coefficient of sound absorption at 250 Hz is 0.40. Obviously, Example 9 represents an improvement over Example 3 for identical thickness of fiberglass. However, contrast Example 9 with Example 13 wherein the panel is comprised of 1 ½ inch thick fiberglass, a ⅛ inch perforation, perforated hardboard and a facing of 16 oz./sq. yard cotton-jute canvas having an SFR of 405 MSK rayls. In the Example 13 panel the absorption coefficient at 250 Hz is 0.95 which represents a vast improvement over Example 3 and certainly a substantial improvement over Example 9.

Further example of the critical nature of the SFR factor is illustrated in a comparison of Examples 12 and 13. In Example 12 the surface mass of the facing material is 19 oz./sq. yard while the material has an SFR of 13 rayls. In Example 13, however, all other factors being equal, the specific surface mass of the material is 16 oz./square yard, which is less than that of Example 12 but the SFR is 405 MKS rayls or over 30 times the SFR of the material of Example 12. The coefficient of absorption at 250 Hz of Example 12 is 0.58 while that of Example 13 is 0.95, an obvious and dramatic improvement.

By way of an optimum example of a combination having the best coefficient of absorption in the 250 Hz range, attention is invited to Example 14 where the facing material is combined with a metal lath "Truss Loop" back and the coefficient is 0.97.

As is quite apparent from an inspection of the test data control of the low frequency sound in the 250 Hz range may not always be feasible to the optimum point because it may be desirable to forego some absorption efficiency in this range in favor of absorption in a higher range, say 1 KHz as for example note the test data of Example 11. Thus depending on given conditions it may be desirable to compromise overall results to effect a given noise level condition. For that reason a range of materials may be selected for a facing, assuming all other conditions and components remain the same and that range of materials may be defined as a fabric facing having a specific surface mass of from 12 oz./square yard to 24 oz./square yard and a SFR of 300 to 1,800 MKS rayls.

Thus one embodiment of the invention comprises a thin panel of perforated backing, heavy textile, and fiberglass therebetween, the entire panel having a thickness in the range from about 1 inch to about 2 inches and a sound absorption coefficient as determined by ASTM C 423-66 of at least about 0.90 at at least one of the test frequencies between and including 250 Hertz and 4 Kilohertz. The invention may also comprise a panel as aforesaid panel having a thickness in the range from about 1 inch to about 2 inches and a sound absorption coefficient as determined by ASTM C 423-66 at 250 Hertz of at least about 0.97 in the range of 250 Hz.

What is claimed is:

1. A thin sound-absorbing panel for use on walls or as a partition or the like comprising a rigid frame a perforated backing selecting from the group consisting of hardboard or perforated metal attached to and covering one side of said frame;

a heavy textile having a SFR of from 300 to 1,800 MKS rayls attached to and covering the other side of said frame;

fiberglass substantially filling the space between said textile and said backing;

said panel having a thickness in the range from about 1 inch to about 2 inches and a sound absorption coefficient as determined by ASTM C 423-66 of at least about 0.90 at at least three of the 1/3 active test frequency bands between and including 250 Hz and 4 Kilohertz.

2. A thin sound-absorbing panel according to claim 1 wherein said backing is made of perforated metal lathing.

3. A thin sound-absorbing panel according to claim 1 wherein said heavy textile is selected from the group consisting of cotton, jute, a mixture of cotton and jute, and nonwoven monoacrylic fiber attached to and covering the other side of said frame, said textile having a surface mass of not less than 12 but more than 24 oz./square yard.

4. A thin sound-absorbing panel according to claim 1 wherein said panel thickness is in the range from about 1 ¼ inches to 1 ¾ inches.

5. A thin sound-absorbing panel according to claim 1 wherein said backing is made of perforated hardboard.

6. A panel according to claim 2 wherein said sound absorption coefficient at 250 Hz is at least about 0.97.

7. A panel according to claim 6 with a thickness in the range from about 1 inch to about 1 ¾ inches which has a sound absorption coefficient at 250 Hertz of at least 0.95 and a sound absorption coefficient at 4,000 Hz of 0.90.

8. A thin sound-absorbing free-standing panel for use on walls or as a partition of the like comprising
a free-standing frame;
a perforated backing attached to and covering one side of said frame;
a heavy textile selected from the group consisting of cotton, jute, a mixture of same, and non-woven monoacrylic attached to and covering the other side of said frame and having a specific flow resistance of from 300 to 1,800 MKS rayls;
fiberglass substantially filling the space between said textile and said backing;
said panel having a thickness in the range from about 1 to 2 inches and an absorbency coefficient of at least 0.97 determined by ASTM C 423-66 at 250 Hertz.

9. A thin, sound-absorbing panel as defined in claim 8 wherein the surface mass of the material is at least 12 oz./square yard.

* * * * *